US010009526B2

(12) United States Patent
Kisner et al.

(10) Patent No.: US 10,009,526 B2
(45) Date of Patent: Jun. 26, 2018

(54) APPARATUS AND METHODS FOR IMAGING INTERIOR SURFACES OF A TUBE OR THE LIKE

(71) Applicant: UT-Battelle, LLC, Oak Ridge, TN (US)

(72) Inventors: Roger A. Kisner, Knoxville, TN (US); Timothy J. McIntyre, Farragut, TN (US); Vincent C. Paquit, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 561 days.

(21) Appl. No.: 14/180,062

(22) Filed: Feb. 13, 2014

(65) Prior Publication Data
US 2015/0229887 A1     Aug. 13, 2015

(51) Int. Cl.
*A61B 1/05* (2006.01)
*H04N 5/225* (2006.01)
(Continued)

(52) U.S. Cl.
CPC .......... *H04N 5/2256* (2013.01); *G02B 5/001* (2013.01); *G02B 23/2461* (2013.01);
(Continued)

(58) Field of Classification Search
CPC ....... A61B 1/05; A61B 1/0676; A61B 1/0684; A61B 1/0005; A61B 1/005; A61B 1/051;
(Continued)

(56) References Cited

U.S. PATENT DOCUMENTS

| 4,934,813 A | 6/1990 | Yaginuma et al. |
| 7,465,271 B2 * | 12/2008 | Kanazawa ......... A61B 1/00096 600/160 |

(Continued)

FOREIGN PATENT DOCUMENTS

EP     0264511 A1     4/1988

OTHER PUBLICATIONS

Fernandes et al., "Using Conical and Spherical Mirrors with Conventional Cameras for 360° Panorama Views in a Single Image," *ICM 2006—IEEE 3rd International Conference on Mechatronics*, pp. 157-160 (2006).

*Primary Examiner* — Dave Czekaj
*Assistant Examiner* — Kehinde O Abimbola
(74) *Attorney, Agent, or Firm* — Klarquist Sparkman, LLP

(57) ABSTRACT

An exemplary device includes, on a longitudinal axis, an illumination-light source, an axicon (conic) mirror, an image sensor, and a tilted optical element. The light source provides illumination light propagating forwardly on the axis. The axicon mirror reflects the illumination light radially outward, relative to the axis, to the interior surface of a tube to produce reflected light propagating, from the illuminated interior surface, as imaging light back to the axicon, which reflects the imaging light rearwardly. The image sensor receives at least a portion of the imaging light rearwardly reflected by the axicon mirror. The tilted optical element, situated between the axicon mirror and the interior surface, moves a selected first portion of the imaging light away from being incident on the image sensor, while allowing a second portion of the imaging light to be incident on the image sensor.

14 Claims, 10 Drawing Sheets

(51) Int. Cl.
*G02B 23/24* (2006.01)
*G02B 5/00* (2006.01)
*G02B 5/10* (2006.01)

(52) U.S. Cl.
CPC ........ *G02B 23/2484* (2013.01); *H04N 5/2252* (2013.01); *G02B 5/10* (2013.01); *G02B 23/243* (2013.01); *G02B 23/2476* (2013.01); *H04N 2005/2255* (2013.01)

(58) Field of Classification Search
CPC ....... A61B 1/04; A61B 1/0607; A61B 1/2676; A61B 1/0002; A61B 1/00041; A61J 15/0003; A61J 15/0069; A61J 15/0073; B29C 65/00; B29C 65/7817; B29C 49/48; B29C 49/52; B29C 65/7802; B29C 65/7814; B29C 66/53241; B29C 2049/2017
See application file for complete search history.

(56) References Cited

U.S. PATENT DOCUMENTS

| | | | | |
|---|---|---|---|---|
| 7,567,342 B2* | 7/2009 | Reinhold | ........... | G06K 9/00046 356/445 |
| 7,636,204 B1 | 12/2009 | Bourget | | |
| 7,944,554 B2* | 5/2011 | Horiuchi | ............... | G01N 21/954 356/237.2 |
| 2004/0114793 A1* | 6/2004 | Bondurant | ........... | G01N 21/954 382/141 |
| 2004/0189987 A1* | 9/2004 | Bondurant | ........... | G01N 21/954 356/241.1 |
| 2005/0049462 A1* | 3/2005 | Kanazawa | ......... | A61B 1/00096 600/170 |
| 2005/0237519 A1* | 10/2005 | Bondurant | ........... | G01N 21/954 356/241.1 |
| 2006/0169159 A1* | 8/2006 | Reinhold | ........... | G06K 9/00046 101/454 |
| 2007/0114367 A1* | 5/2007 | Craven-Bartle | ........ | G03B 15/00 250/227.13 |
| 2009/0262354 A1* | 10/2009 | Horiuchi | ............... | G01N 21/954 356/445 |
| 2010/0328272 A1* | 12/2010 | Craven-Bartle | ....... | G03B 15/00 345/179 |
| 2012/0065469 A1* | 3/2012 | Allyn | ..................... | A61B 1/005 600/109 |
| 2012/0172665 A1* | 7/2012 | Allyn | ..................... | A61B 1/005 600/112 |
| 2014/0024895 A1* | 1/2014 | Allyn | ..................... | A61B 1/005 600/112 |
| 2016/0045674 A1* | 2/2016 | Blei | ........................ | A61M 5/24 604/207 |

* cited by examiner

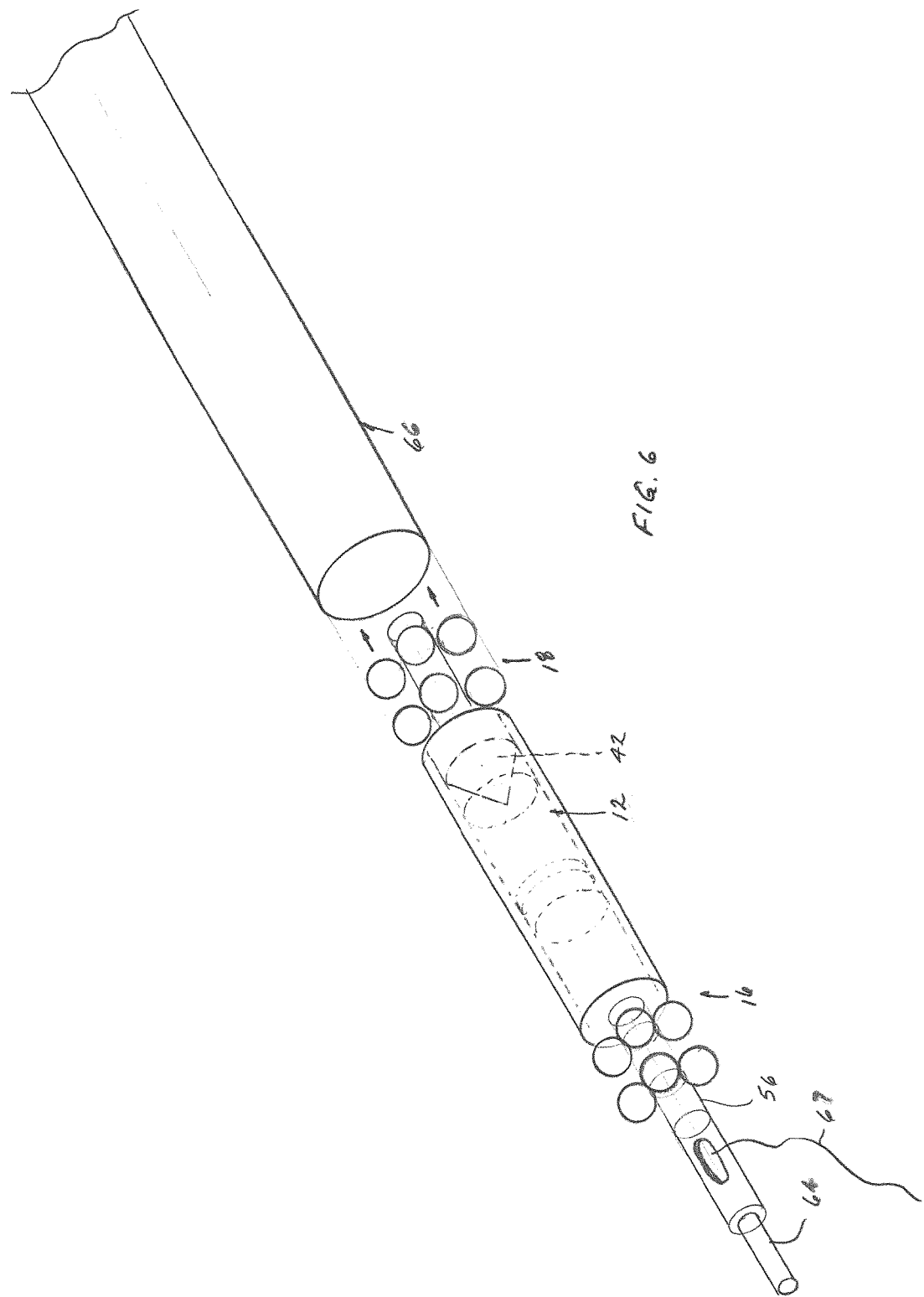

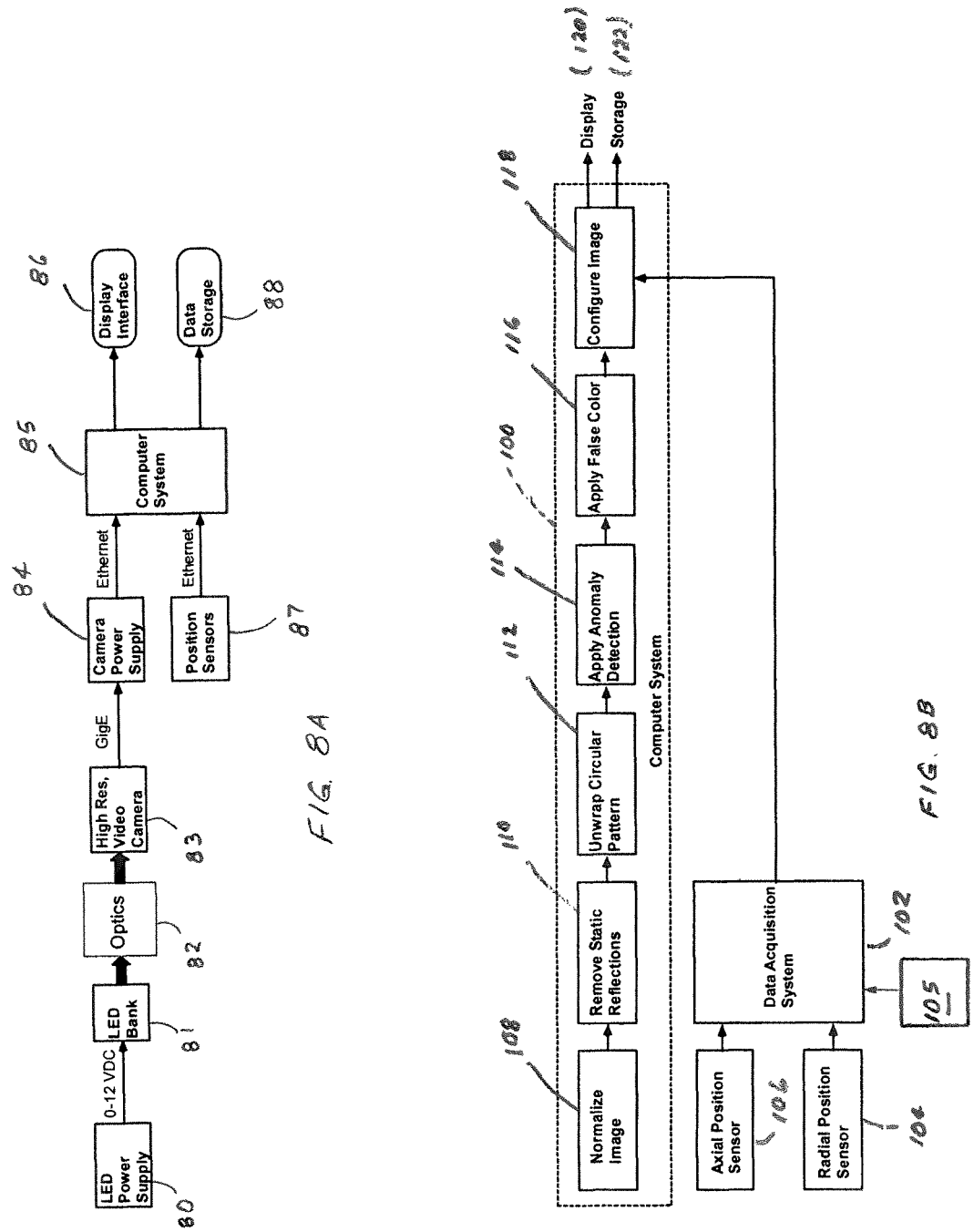

APPARATUS AND METHODS FOR IMAGING INTERIOR SURFACES OF A TUBE OR THE LIKE

STATEMENT REGARDING FEDERALLY SPONSORED RESEARCH AND DEVELOPMENT

This invention was made with government support under Contract No. DE-AC05-00OR22725, awarded by the United States Department of Energy. The government has certain rights in this invention.

FIELD

This disclosure pertains to, inter alia, optical devices that are inserted into a tube, pipe, conduit, or the like for the purpose of producing images of the interior surface thereof.

BACKGROUND

Whereas it is relatively easy to inspect the outer surfaces of tubes, conduits, and the like, inspecting the interior surfaces of these objects poses certain challenges. A first challenge is illumination. Imaging a surface requires that light be directed or otherwise delivered onto the surface. Especially if the tube is made of an opaque material or is surrounded by an opaque material such that light cannot penetrate through the material into the lumen of the tube, delivering sufficient light to the interior surface can be very difficult, especially if the tube has any significant length and/or has light-obstructing internal structure such as ribs or the like. Even if imaging light is deliverable to the inside of the tube, a second challenge pertains to maximizing image-producing light while minimizing image-degrading light. A third challenge is the spatial constraints imposed by the tube geometry. Whatever must be inserted into a tube to produce images of the interior surfaces of the tube must have a smaller diameter than the tube and must be deliverable to locations of interest in the tube. A fourth challenge is keeping image-forming components (e.g., optical elements and camera) of an imaging device clean, particularly in a manner that does not interfere with illuminating and imaging. A fifth challenge is forming good-quality images in which imaging artifacts are minimal and in which tube-structural anomalies of interest are distinguishable. A sixth challenge pertains to determining the locations of anomalies or other features of interest or concern that were discovered during imaging.

U.S. Pat. No. 7,636,204 to Bourget discusses a device for imaging the interior surface of a shallow cylindrical object or hole. The device, essentially a microscope, has a distal end having a source that produces illumination light and a proximal end that includes imaging optics. At the distal end, a compound conical-surface reflector directs light from the source radially onto the interior surface. Light reflected from the surface to the device is reflected from the compound conical-surface reflector to the optics in the proximal end that produce the image. Only the distal end is inserted into the cylinder; the proximal end remains outside the cylinder. One disadvantage of the Bourget system is its inability for use in imaging the interior surfaces of anything other than shallow cylindrical holes. There is no provision for inserting the Bourget system into a hole, tube, or the like having an axial length that is substantially greater than the diameter of the hole. Other disadvantages are the device's vulnerability to incursion of soil and other contaminants from the environment during use, and the difficulty of cleaning the device.

Another device for producing images of the interior surface of a pipe is discussed in U.S. Pat. No. 4,934,813 to Yaginuma. The Yaginuma device has several disadvantages. For example, imaging light is produced at the proximal end of the device, which is not inserted into the pipe; only the distal end is inserted. The imaging light propagates (e.g., by optical cable) in an axial image-transmitting path to the distal end of the device to illuminate the interior surface of the pipe. Any images thus formed must return from the distal end to a camera located at the proximal end. The resulting long passages from the distal end to the proximal end degrades image quality. Second, the Yaginuma device is difficult to keep clean during use, and debris accumulated on the optical surfaces of the device substantially degrades image quality. Third, despite its touted ability to prevent image halation, image quality is not ideal, particularly whenever the Yaginuma device is being used to image an interior surface that is rough, corrugated, or otherwise uneven.

SUMMARY

The disclosed devices provide non-destructive, 360° imaging of the interior surface of a tube or conduit, including but not limited to corrugated conduits in which the interior surfaces include complex structure (e.g., ridges and valleys). The images obtained by the devices allow defects in the tube, on or involving the interior surfaces, to be located easily and accurately. For example, in a corrugated tube, the devices can provide images revealing improperly configured ridges and valleys, welding and other joining faults, particulate matter (especially located in the valleys), incorrect slopes of ridges and/or valleys, incorrect spacing of ridges (i.e., pitch of ridges and/or valleys), incorrect depth of valleys or height of ridges, narrow or missing ridges, undesirable machining marks, and other defects.

The devices can be used with any of various types of pipes, tubes, and conduits, living or non-living, all collectively termed "tubes." A tube can be any of various longitudinally extended voids defined by interior walls, which can have smooth surfaces or surfaces that are not smooth, or both. Non-smooth walls are encountered in, for example, corrugated cylindrical waveguides. An example smooth-walled tube is a living tube or a hole produced by precision machining. Further alternatively, a tube can simply be a hole defined in a mass of material, e.g., a hole in the earth or other mass of material. Holes are not limited in terms of orientation in space or depth or size. Many holes are cylindrical, but this is not intended to be limiting. The devices disclosed herein can be used to inspect finished tubes as well as tubes being manufactured, e.g., the devices can be used for obtaining quality data during or after manufacture. The devices can be used in conjunction with identifying and correcting defects, including determinations of defect types and causes, in tubes and holes. The devices also can be inserted into the lumina of anatomical structures such as animal intestines or the like and used for inspecting the interior walls of such structures.

In corrugated tubes, defects of particular interest often pertain to particulate matter disposed in valleys of the corrugations where debris tends to collect, or to phenomena (e.g., corrosion) occurring as a result of debris accumulation and/or other phenomena, or to problems arising during manufacturing, such as welding faults or machining defects.

Various embodiments of the devices comprise a housing, but they all have a proximal end and a distal end, wherein the device is insertable, distal-end first, into a tube. Between the proximal and distal ends is a source of illumination light, which can be an in situ producer of illumination light located in the housing or be a location to which illumination light produced elsewhere is delivered, such as by optical fibers or the like. In any event, light from the source is directed axially toward the distal end and directed by the device radially outward from the distal end to the adjacent interior surface of the tube. This radial direction of illumination light is achieved using a conical mirror, termed an "axicon," situated on the axis near the distal end. The axicon has a conical surface (the apex of which is on the axis facing the proximal end). The axicon receives axially propagating illumination light from the source and reflects the illumination light radially outward (relative to the axis) to illuminate corresponding portions of the interior surface of the tube in which the device is inserted. The axicon desirably is contained in a housing.

For illuminating the interior surface of a tube, various embodiments utilize, as a source of illumination light, an in situ array of bright light-emitting elements, such as an array of LEDs. As in situ producers of light, the LED array is situated between the proximal and distal ends of the device, such that illumination light propagates forwardly (toward the distal end) from the array to the axicon.

LEDs have advantages for use as an illumination-light source, including small size, brightness, low power consumption, ruggedness, and reliability. However, it is desirable that actual images of the LEDs not appear in images of illuminated regions of the interior surface of the tube. This is because images of light-emitting elements such as LEDs are usually much brighter than the images of the interior surfaces and thus tend to saturate and reduce the detail being shown in the latter.

Various embodiments of the device also include an image sensor located at or near the proximal end of the device. The image sensor receives imaging light produced by reflection of illumination light from the interior surface of the subject tube. From the interior surface, the imaging light propagates radially toward the axis to the axicon, which reflects the imaging light rearwardly (toward the proximal end). The image sensor is situated such that a selected portion of the imaging light propagates to the sensor. The sensor produces, from imaging light reaching it, a set of electronic data corresponding to the optical image of the particular region of the interior surface currently being illuminated.

To prevent images of light-emitting elements from appearing on the interior-wall images, the devices include a tilted optical element, situated coaxially on or near the distal end, that produces corresponding slight bends in the light-propagation pathway to and from the axicon. The resulting slightly bent pathways cause light coming directly from the light-emitting elements to be redirected away from entering the image sensor, thus preventing the relatively bright images of the light-emitting elements from being included in the image being sensed by the image sensor. The resulting image produced by the device usually exhibits more uniform illumination and usually reveals more detail of the interior surface of the tube or structures viewed within a surrounding material. In many device embodiments, the tilted optical element has a frustoconical configuration, with the narrower end facing rearwardly. The tilted optical element can readily be configured as an integral part of the housing.

In view of the above, a representative embodiment of a device for imaging the interior surface of a tube comprises, on a longitudinal axis, a source of illumination light, an axicon (conical) mirror, an image sensor, and a tilted optical element. Sources of illumination light encompass not only light-producing elements such as incandescent elements, fluorescent elements, light-emitting diodes (LEDs), lasers, and the like, but also devices that produce the light remotely and deliver the light to the device via light conduits such as, but not limited to, optical fibers and optical cables. In the devices, the illumination light from the source propagates forwardly on the axis (i.e., the light propagates proximal-to-distal relative to the axis). At or near the distal end of the device, the axicon mirror reflects the illumination light radially outward, relative to the axis, to the interior surface of a tube. Illumination light reflects from the interior surface as "imaging light." The imaging light returns to the axicon mirror, which reflects the imaging light rearwardly, by which is meant that the light propagates distal-to-proximal relative to the axis. The image sensor receives at least a portion of the imaging light that was rearwardly reflected by the axicon mirror.

The tilted optical element is situated at or near the distal end between the axicon mirror and the interior surface of the tube, such that light propagating radially to and from the axicon mirror is incident on the tilted optical element. The tilted optical element directs (e.g., by refraction) a selected first portion of the imaging light away from being incident on the image sensor, while allowing a second portion of the imaging light to be incident on the image sensor. These "portions" are not limited to spatial portions; they encompass imaging light from different respective origins. In many embodiments, the first portion of imaging light is light capable of forming images of the light-emitting elements that produce the illumination light, whereas the second portion is imaging light reflected from the interior surface of the tube and not capable of forming images of the light-emitting elements. Therefore, particularly if the source of illumination light comprises one or more light-emitting elements, the selected first portion of imaging light directed by the tilted optical element away from being incident on the image sensor comprises an image of the light-emitting element(s). Similarly, if the light source comprises an array of multiple light-emitting elements (e.g., an array of LEDs or of light-emitting termini of optical fibers), the selected first portion of imaging light directed by the tilted optical element away from being incident on the image sensor mainly comprises images of the light-emitting elements.

Desirably, the device further comprises a housing that contains at least the light source, the axicon mirror, and the image sensor. The housing desirably extends along the axis and includes a proximal end and a distal end. The housing is advantageous for keeping the light source, axicon, image sensor, and other components at defined positions relative to each other and for protecting these components from dirty environments. A particularly useful shape of the housing for insertion into most holes and tubes is cylindrical. A cylindrical housing favors use of an axicon (conic) mirror that is contained in the housing and reflects illumination light radially 360° outward relative to the axis and receives imaging light propagating radially 360° inward relative to the axis.

The tilted optical element advantageously comprises an optical window that is tilted more than 0° but at most 10°, relative to the axis. The tilted optical window can be a respective portion of the housing at or near the distal end. If the housing is cylindrical in shape (a most desirable shape for use with most types of tubes and holes), the tilted optical window desirably has a frustoconical shape (coaxial with the axicon), of which the narrower end faces rearwardly. The tilted optical window allows illumination light to pass through the window in a radially outward manner from the axicon to the interior surface of the tube and allows imaging light to pass through the window in a radially inward manner from the interior surface to the axicon.

Particularly for imaging purposes, many embodiments of the device further comprise a lens assembly situated on the axis between the image sensor and the source of illumination light. Thus, the lens assembly is positioned to receive imaging light intended for incidence on the image sensor. In such embodiments the tilted optical element prevents the first portion of imaging light from entering the lens assembly. To such end, certain embodiments include a plate or member to which the tilted optical element deflects the selected first portion of imaging light. An exemplary plate or member has an annular shape, centered on the axis. The annular shape facilitates separation of the first and second portions of imaging light by the tilted optical element tilted at a small angle (greater than 0° but up to 10°) relative to the axis. The plate or member can be used to support an array of plural light-emitting elements of the source of illumination light; thus, the plate or member is situated at about the location of the source of illumination light. An annularly shaped plate defines a central void, and if the plate is located substantially at the light source, then separation of the first and second portions of imaging light is facilitated even further, in that the first portion is redirected to be obstructed by the plate and the second portion (not redirected) simply propagates through the central void to the image sensor. If the device includes a lens assembly, the assembly is situated between the image sensor and the plate so that light allowed to propagate through the central void of an annular plate located just distally of the lens assembly passes through the void and through the lens assembly to the image sensor.

The image sensor is, in many embodiments, configured as a "camera" which includes any of various image sensors. The camera can be a continuous-imaging type (e.g., a video camera) or still camera, for example. The image sensor can be monochromatic or poly-chromatic (e.g., color sensing). The image sensor can be sensitive to any of various appropriate wavelengths of imaging light; a representative range is infrared (IR) to visible to ultraviolet (UV). Data obtained by the image sensor can be subjected to various signal-processing routines, for example to produce displayed images, to allow data storage and recall, to interpret the data, and/or for any of various other purposes. For example, plenoptic imaging configurations can be implemented to analyze three-dimensional structures viewed through a transparent tube.

The foregoing and additional features and advantages of the subject of this disclosure will be more apparent from the following detailed description, which proceeds with reference to the accompanying drawings.

BRIEF DESCRIPTION OF THE DRAWINGS

FIG. 6 is an isometric view of the embodiment of FIG. 1 being inserted into a tube.

FIG. 8A is a hardware block diagram of various embodiments of devices, including the embodiment of FIG. 1.

FIG. 8B is a software block diagram of various embodiments of devices, including the embodiment of FIG. 1.

DETAILED DESCRIPTION

This disclosure is set forth in the context of representative embodiments that are not intended to be limiting in any way. This disclosure is directed toward all novel and non-obvious features and aspects of the disclosed embodiments, alone and in various combinations and sub-combinations with one another. The disclosure is not limited to any specific aspect or feature or combinations thereof, nor does the disclosure require that any one or more specific advantages be present or problems be solved.

As used herein, the singular forms "a," "an," and "the" include the plural forms unless the context clearly dictates otherwise. Additionally, the term "includes" means "comprises." Further, the term "coupled" encompasses mechanical as well as other practical ways of coupling or linking items together, and does not exclude the presence of intermediate elements between the coupled items.

In the disclosure, certain terms may be used such as "up," "down," "upper," "lower," "horizontal," "vertical," "left," "right," "proximal," "distal," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Figure 1:
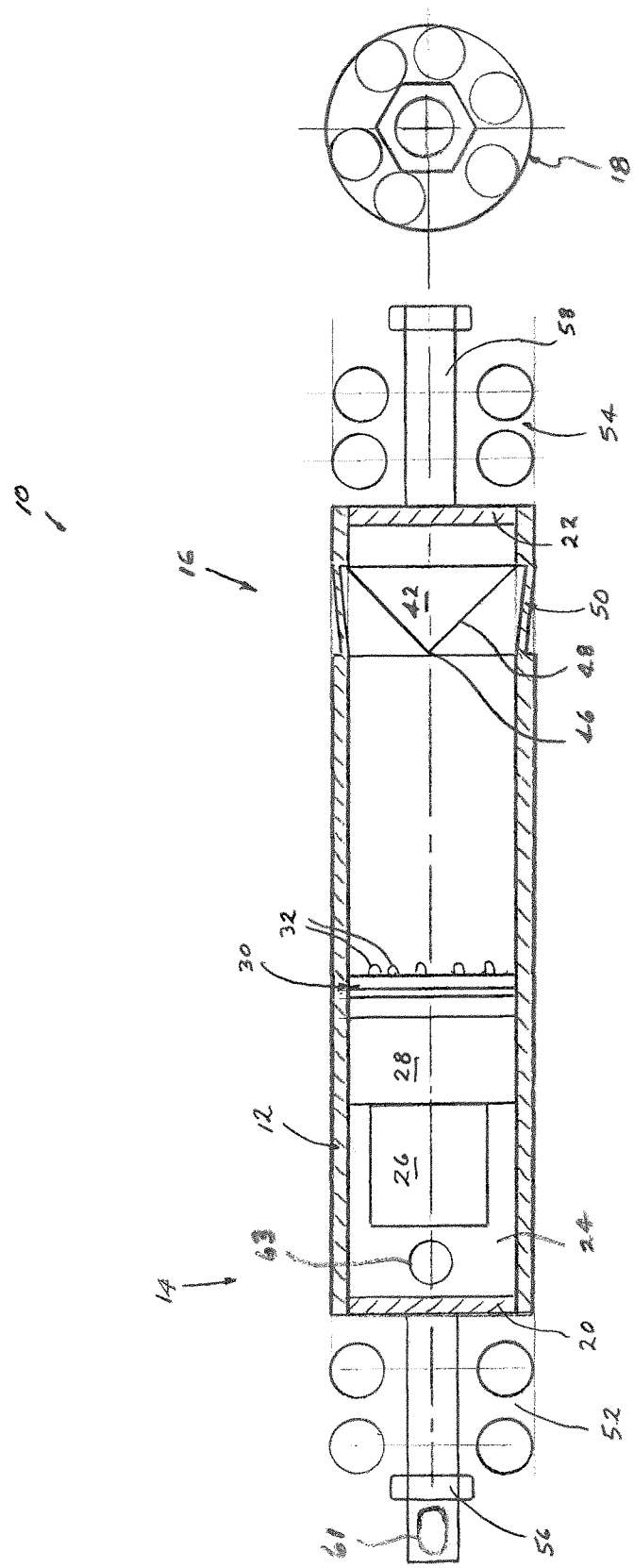
FIG. 1 provides orthogonal views of a representative embodiment of an imaging device.

A representative embodiment of a device 10 for imaging and/or otherwise inspecting the interior surface of a tube is shown in FIG. 1. The device 10 comprises a housing 12 extending along an axis A. The housing 12 has a proximal end 14 and a distal end 16. The housing 12 is depicted as being cylindrical, with a circular transverse profile 18, but this particular geometry is not intended to be limiting; the housing 12 can have any convenient transverse profile suitable for inserting the device into the lumen of a tube (see FIG. 6). Since most tubes are cylindrical, most embodiments of the device 10 are correspondingly cylindrical. For convenience, the discussion below is set forth in the context of the device 10 being cylindrical.

The proximal end 14 and distal end 16 of the housing 12 each comprise an end cap 20, 22, respectively, which mainly serve to prevent incursion of debris into the housing. The housing 12 has a transverse dimension (e.g., diameter) suitable for insertion of the device 10 coaxially in a tube. This transverse dimension ranges from being just small enough to allow the device 10 to slip-fit into a subject tube to being substantially smaller than the diameter of the tube. In this context, since it is desirable that the device 10 remain coaxial with the tube whenever the device is in the tube producing images, the term "substantially smaller" from a practical standpoint includes any device diameter that still allows the device to remain coaxial with the tube whenever the device is in the tube.

For most applications, the device 10 is configured to be inserted fully into the tube, and to be deliverable to locations at any of various distances inside the tube. Situated in the lumen 24 of the proximal end 14 of the housing 12 is an image sensor 26, also termed herein a "camera" 26, desirably mounted coaxially with the housing. Also located in the lumen 24, just forward of the camera 26 and coaxially with the housing 12, is a lens assembly 28. The lens assembly 28 receives imaging light propagating from the distal end 16 and prepares that light for reception by the camera 26. The lens assembly 28 is not limited to configurations containing only one lens element. The lens assembly 28 can have multiple lens elements for, e.g., better aberration correction than obtainable using only one element.

The lens assembly 28 desirably provides adjustability of aperture and/or focus of light passing through the lens assembly to the camera 26. This adjustability can be automatic; e.g., the lens assembly 28 can be provided with autofocus capability. Alternatively, this adjustability can be manual, via an access port (not shown) defined in the housing 12. Also, if desired, the lens assembly 28 can be provided with a zoom feature enabling it to change its magnification or power. The zoom feature can be automatic or manual.

Figure 2:
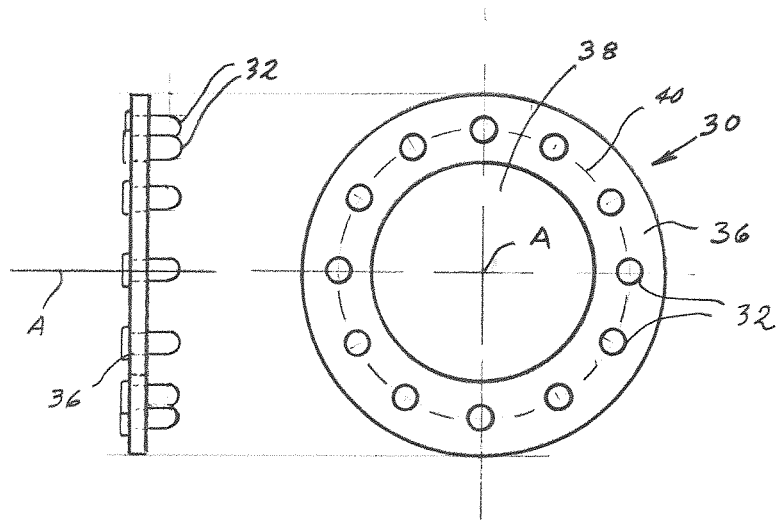
FIG. 2 provides orthogonal views of the illumination light source used in the embodiment shown in FIG. 1, wherein the light source comprises an array of LEDs.

Located distally of the lens assembly 28 is an imaging light source 30. In many embodiments, the light source 30 comprises an array of multiple bright light-emitting elements 32 such as, but not limited to, LEDs. In the depicted embodiment (FIG. 1) the imaging light source 30 comprises a circular array of LEDs, arranged as shown in FIG. 2. LEDs are particularly advantageous for light production because they are durable and bright and have low power consumption. The LEDs can be types that produce light of substantially one wavelength (e.g., 640 nm) or light of multiple wavelengths (e.g., white-light LEDs). In other embodiments the light source 30 comprises multiple incandescent or fluorescent light-emitting elements, for example. In yet other embodiments the light-emitting elements 32 can be respective first ends of optical fibers or the like, wherein the respective second ends extend from the device 10 to a remote light source to deliver light from the remote source to the device 10. In yet other embodiments, the light source 30 comprises one or more fluorescent light-emitting elements. In the depicted embodiment the light-emitting element(s) 32 are mounted on an annular plate 36 that defines a central aperture 38. The central aperture 38 leads directly to the lens assembly 28, as described in more detail below.

The number of individual light-emitting elements 32 actually used depends, at least in part, on the type of light-emitting elements used, the intensity of illumination light required to produce desired images of the interior surface of the subject tube, the intensity of illumination light produced by the light-emitting elements, the wavelength of the illumination light, the size of the annular plate 36, and the dispersive properties of the light-emitting elements. For example, the light source 30 can comprise multiple LEDs as light-emitting elements 32, multiple incandescent sources, or multiple optical cables delivering respective illumination light produced by a remote source. The light source 30 is not limited to configurations in which the light-emitting elements 32 are respective point-sources of light; rather, the illumination light produced by the light source 30 can be diffuse such as light produced by one or more fluorescent panels.

The wavelength of illumination light utilized by the device 10 is not limited to visible light; the illumination light can be IR and/or UV and/or some combination of IR, UV, and visible light. The illumination light is not limited to one wavelength or to any particular wavelength. The illumination light can have multiple wavelengths. The wavelength(s) can be selected for achieving a desired contrast of features of interior surfaces imaged by the device 10. Also, the wavelength of produced light need not be constant; the wavelength can be variable, depending upon imaging conditions. For example, the light source 10 can be controlled to produce both visible and UV light in a series manner. The intensity of light may also be variable.

FIG. 2 provides orthogonal views of an exemplary configuration of a light source 30 comprising multiple LEDs (as light-emitting elements 32) arranged equi-angularly regularly around a circle 40 on an annular plate 36. Arrangement of light-emitting elements on a single circle is not limiting. In other embodiments, respective light-emitting elements 32 are arranged in two or more concentric circles on the plate. Generally, a larger number of individual light-emitting elements 32 produces correspondingly more illumination light than fewer such elements. For greater illumination intensity, LEDs or termini of optical fibers can be arranged around two or more concentric circles.

Figure 3A:
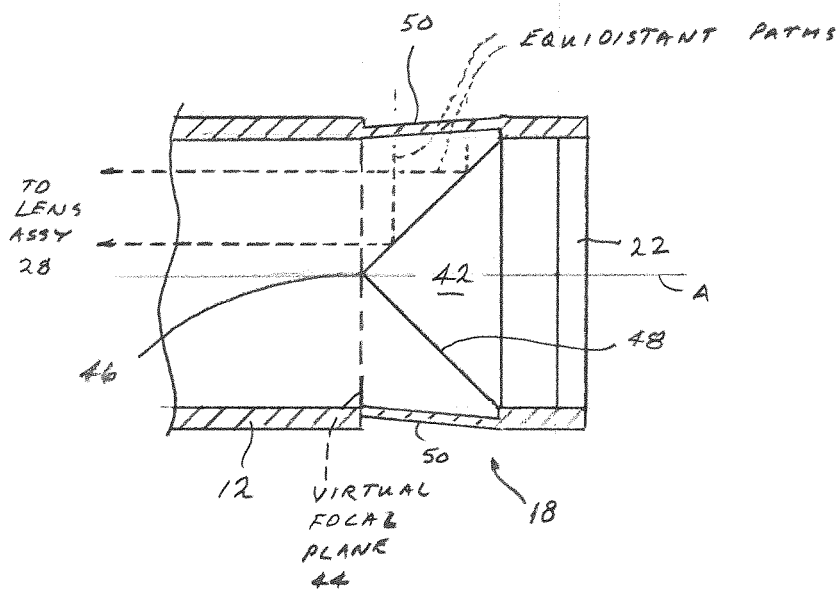
FIG. 3A is a section of the distal end of the embodiment of FIG. 1, showing details of an exemplary tilted optical element.
Figure 3B:
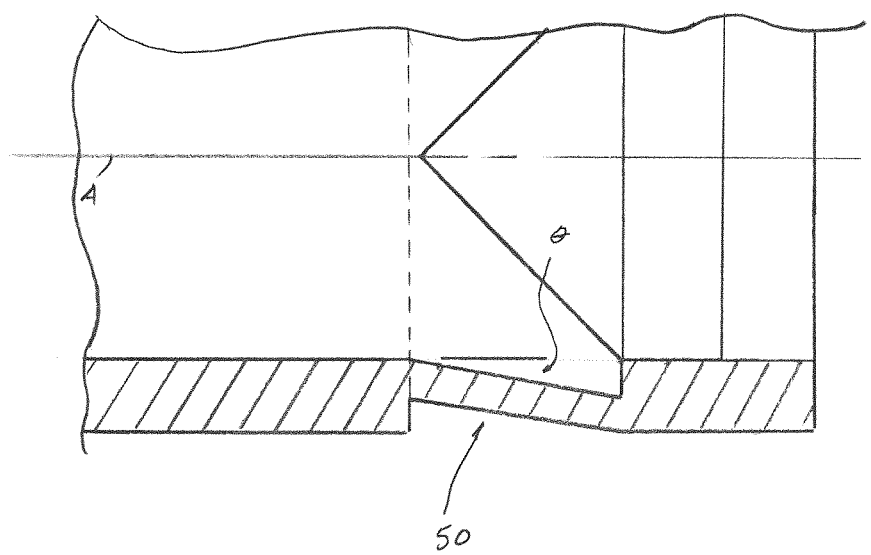
FIG. 3B is a close-up of the lower right of the view shown in FIG. 3A.

Situated coaxially in the distal end 16 of the housing 12 is a cone-shaped mirror 42 (known and termed in the art as an "axicon"). (See FIGS. 1 and 3.) In the distal end 16, the axicon 42 receives light from the light source 30 and directs the light radially outward (relative to the axis A) from the housing 12 to the interior surface of the tube being examined. Light reflected from the interior surface of the tube enters the housing 12 and is reflected by the axicon 42 toward the proximal end 14 of the housing 12. The conical reflective surface 48 of the axicon 42 directs illumination light radially over a full 360° region of the interior surface of the tube being examined. The resulting image is a full 360° unobstructed view of the interior surface. As shown in FIG. 3, a virtual focal plane 44 is situated at the apex 46 of the axicon 42. Rays reflected from different locations on the conical reflective surface 48 propagate identical distances to the virtual focal plane 44. From the virtual focal plane 44, the reflected light propagates to the lens assembly 28 and camera 26.

The housing 12 is particularly effective in providing components inside the housing with a clean environment.

The housing 12 prevents incursion of dust, dirt, vapor, and liquids, and thus keeps particularly the lens assembly 28, camera 26, and reflective surface 48 clean.

Figure 4:
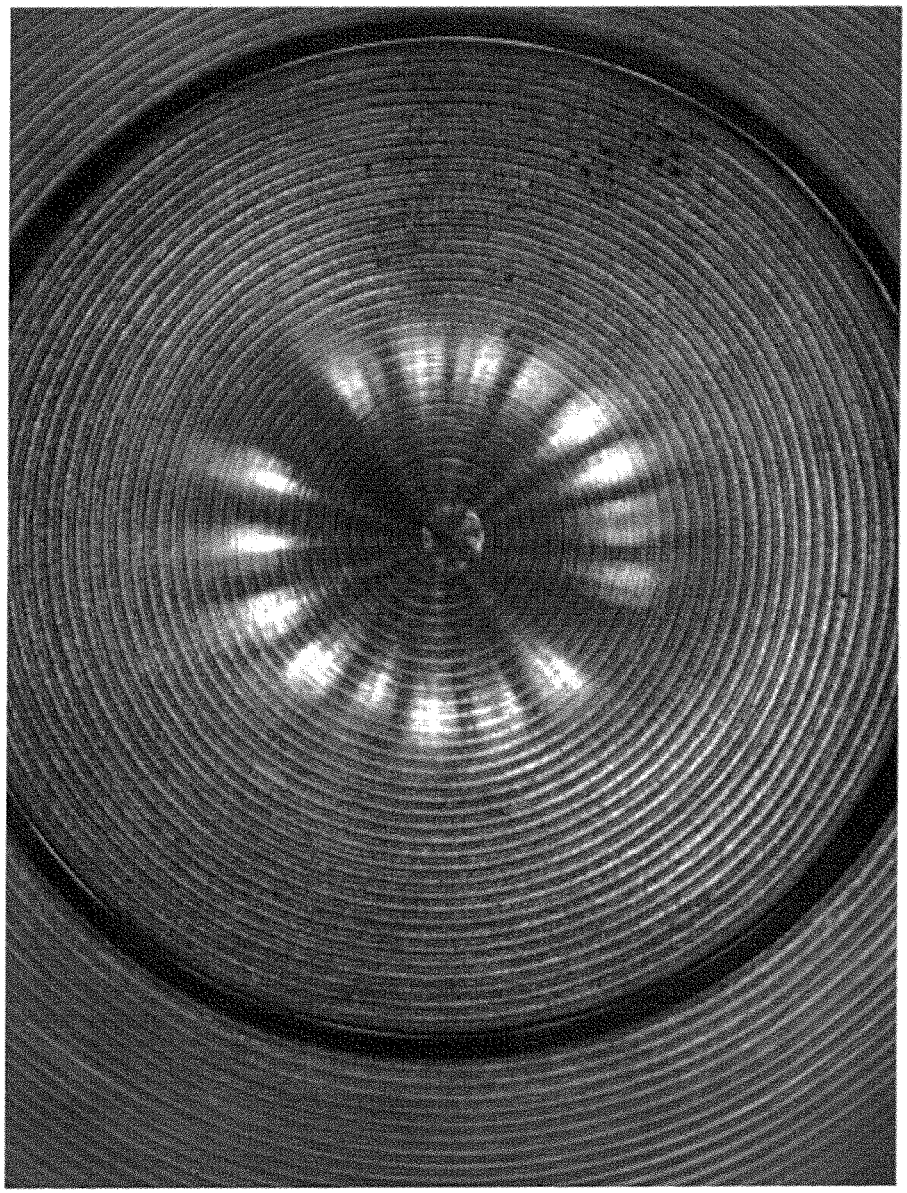
FIG. 4 is an exemplary photograph of the interior surface of a corrugated tube, wherein the image was obtained using a device as shown in FIG. 1 but lacking the tilted optical element, thus producing an image that includes bright, saturated images of the LEDs. These saturated images of the LEDs tend to dominate the picture and wash out details of the interior surface that one hopes to see in the pictures.

To ensure that sufficient light reaches the interior surface of the tube for imaging purposes, the housing 12 is desirably transmissive to the light produced by the light source 30, at least at the distal end 16 where light passes through the housing wall. (For convenience, substantially the entire housing 12 is made of a light-transmissive material, such as clear PLEXIGLAS, clear polycarbonate, or clear acrylic). If the light source 30 comprises multiple individual light-emitting elements (such as LEDs), the illumination light reflected from the conical surface 48 of the axicon 42 will include corresponding images of the light-emitting elements (see FIG. 4). These images of the light-emitting elements 32 are typically "brighter" (more saturated) than images of the interior surface of the tube. If these images of the light-emitting elements are allowed to reach the camera, they can substantially degrade the quality of the desired image of the interior surface of the tube.

As noted, the axicon 42 has a cone-shaped reflective surface 48 that faces the lens assembly 28 and light source 30, including the central aperture 38 of the light source. The opening angle of the reflective surface 48 is shown as being approximately 90°, but this is not intended to be limiting. The particular opening angle can be based on, for example, the axial distance from the axicon 42 to the central aperture 38. The material of which the axicon 42 is made can be any rigid material of which the conical surface 48 can be made reflective. For example, the axicon can be made of aluminum, wherein the conical surface 48 is coated with silver or gold. Alternatively, the axicon 42 can be made of an organic polymer coated with a reflective layer. The axicon 42 desirably provides a constant focal plane over the full range of viewing distance and is a means for reflecting illumination light radially (and without any obstruction) over a full 360° relative to the axis A.

In the depicted embodiment the distal end 18 of the housing 12 includes a transparent, circumferential, tilted optical element 50. See FIGS. 3A and 3B, which depict the tilted optical element 50 as being frustoconical in shape, with the narrower end of the optical element facing rearwardly (i.e., toward the proximal end 16). The tilted optical element 50 can be a corresponding circumferential "window" of or in the housing 12, as shown, or can be made separately and attached to the housing 12, or can be a separate optical element situated between the housing 12 and the conical surface 48 of the axicon 42. In any event, the tilted optical element 50 is located to pass illumination light from the axicon 42 to the interior surface of the subject tube and back again (as imaging light), while bending the propagation path of the imaging light slightly to prevent selected portions of the imaging light from entering the camera 26. For this purpose, the tilted optical element 50 is situated at a small angle θ relative to the axis A. An advantageous range for the angle θ of the tilted optical element 50 relative to the axis A is 5° to 10°, or more preferably 6° to 7°. Thus, the tilted optical element 50 bends light, propagating directly from the light-emitting elements 32 and reflected from the interior surface of the housing and/or interior surface of the tube, sufficiently to prevent that light from passing through the central aperture 38 to the camera 26. Thus, the tilted optical element 50 tilts the beams of relatively bright images of the LEDs to prevent the beams from entering the primary imaging zone of the camera 26, and thus prevents appearance of the bright images of the LEDs (saturated reflections) in the images produced by the camera. In the depicted embodiment, the angle θ advantageously results in incidence of LED-image light onto the surface of the annular plate 36 rather than through the aperture 38. Meanwhile, the imaged region of the interior surface of the tube is illuminated with scattered light having a substantially uniform intensity, which produces images having substantially uniform illumination.

Figure 7A:
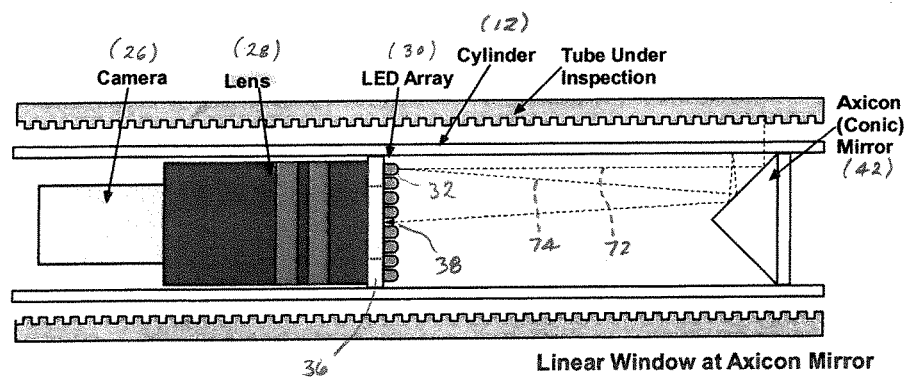
FIG. 7A is a sectional view of the distal portion of a device situated in the lumen of a corrugated tube, wherein the device lacks the tilted optical element and thus produces images, such as shown in FIG. 4, in which saturated images of bright light-source elements appear in the picture and obscure other details.
Figure 7B:
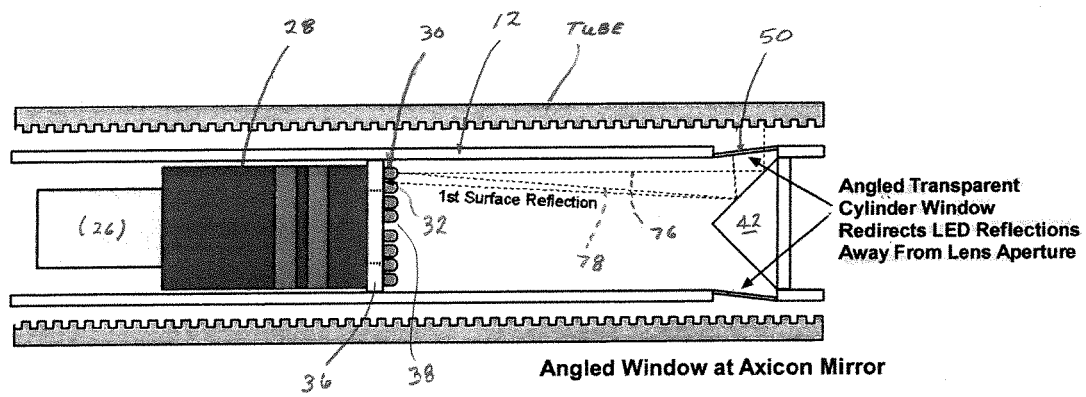
FIG. 7B is a sectional view of the distal portion of a device situated in the lumen of a corrugated tube, wherein the device includes a tilted optical element.

A benefit of the tilted optical element 50 is illustrated in FIGS. 7A and 7B. FIG. 7A depicts a device lacking the tilted optical element (i.e., the device has a "linear" optical window, wherein the "window" is simply a region of the cylindrical housing 12 adjacent the axicon 42). A first ray trace 72 denotes propagation of light from an LED 32 to the axicon 42, from which the light is reflected onto the interior surface of a tube being inspected. A second ray trace 74 denotes propagation of light from the LED to the axicon 42, from which the light reflects toward the interior surface of the housing 12. In FIG. 7A this light 74 brightly reflects from the interior surface of the housing back to the axicon 42, which reflects the light through the central aperture 38 of the plate 36 and through the lens assembly 28 to the camera 26. The resulting image produced by the camera 26 includes not only features of the interior surface of the tube but also the bright images of the LEDs (see FIG. 4). These LED images usually appear as saturated regions that obscure the image of the interior surface of the tube. FIG. 7B depicts a device that includes the tilted optical element 50 (i.e., includes an "angled" window instead of the "linear window" shown in FIG. 7A). A first ray trace 76 denotes propagation of light from an LED of the array 30 to the axicon 42, similar to what is shown in FIG. 7A. A second ray trace 78 denotes propagation of light from the LED to the axicon 42, which reflects the light to the tilted optical element 50. Light reflected from the tilted optical element 50 is reflected from the axicon 42 to the surface of the LED array 30. Thus, such light is redirected from entering the lens assembly 28 or camera 26, which removes the bright LED images from the image, produced by the camera 26, of the interior surface of the tube under inspection. Meanwhile, more scattered light from the interior surfaces of the tube does reach the camera 26, which produces a corresponding image of the illuminated interior region of the tube.

Figure 5:
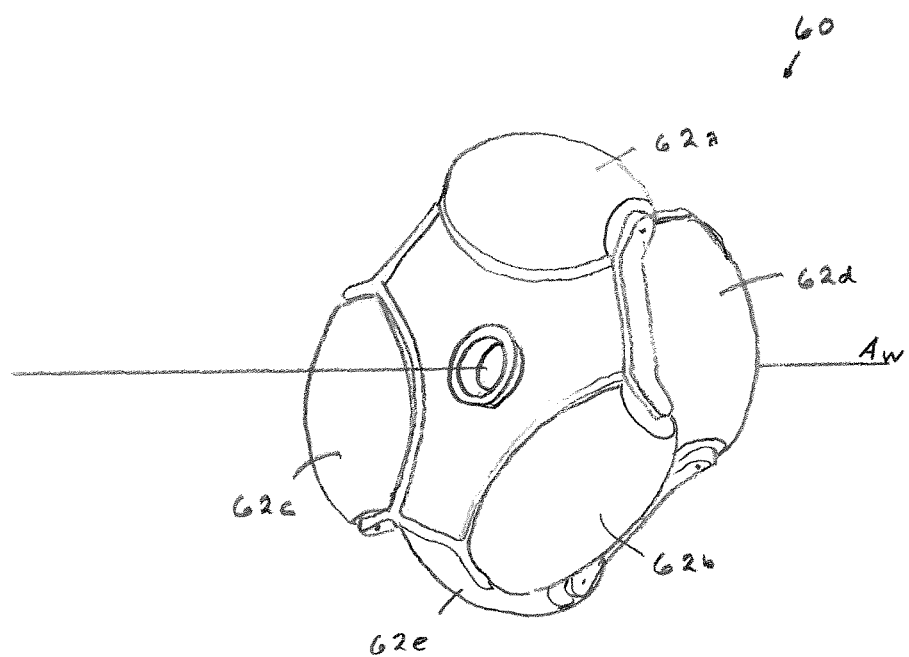
FIG. 5 is a perspective view of an omni-wheel that can be installed on the proximal and distal ends of the device of FIG. 1.

As the device 10 is being used to image the interior surface of a tube, it is desirable that the device be situated coaxially within the tube and be able to move with minimal friction while in the tube. To such end, the proximal end 16 and distal end 18 of the housing 12 can comprise respective roller assemblies 52, 54. A particularly advantageous configuration of a roller assembly 52, 54 is that of an "omni-wheel" (also called an "omni-roller") as known in the art. As exemplified in FIG. 5, an omni-wheel 60 is a wheel having multiple rollers 62*a*, 62*b*, 62*c*, 62*d*, 62*e* (a sixth roller is not visible) arranged around a wheel circumference. The respective rotational axes of the rollers are different from one another but are perpendicular to the rotational axis Aw of the wheel, thereby allowing the device, to which the omni-wheel is attached, to slide laterally in the lumen of the tube. (See FIG. 5.) The rollers 62*a*-62*e* of the omni-wheel can be passive; alternatively, one or more of the rollers can be powered to make the device 10 self-propelled in the tube. In other examples the rollers 62*a*-62*e* are spring-loaded radially outwardly to aid in centering the device 10 in the tube. Thus, the rollers collectively facilitate motion of the device in the tube while keeping the device coaxial with the tube. Each omni-wheel 60 is axially mounted (axes A and Aw coincide) to the housing 12 using a respective bolt 56, 58 or analogous fastener threaded into the respective end cap 20, 22.

Turning to FIG. 6, the device 10 can be tethered to a rigid or flexible member 64 useful for controlling and/or limiting movement of the device in the lumen of a tube 66. For example, the device 10 can be connected to the terminus of a rod or the like, allowing a user to insert the device into the tube and manually constrain the device to move along the tube axis in the lumen of the tube. Alternatively to manual control, the movement of the device in the tube can be performed by attaching the tether to a mechanism that moves (including automatically moves) the device by moving the tether. In another example the device 10 is tethered to a flexible member 68 such as a rope, cable, or the like. A tether, whether flexible or rigid, is particularly useful if the device 10 is to be inserted into a tube 62 that is not horizontal. At least the fastener 56 on the proximal end 14 can be provided with a threaded head (either male or female) useful for coupling the device 10 to a tether having a complementary thread.

The device 10 can include a position-measurement device useful for determining the position of the device inside a tube. For most applications, the position-measurement device is a type of encoder. For example, in one embodiment the position-measurement device is configured as a linear encoder that "counts" fixed, linearly arranged encoder marks as the device is moved in the tube. The encoder marks can be provided on a stationary, linearly extended encoder bar situated in the tube parallel to the tube axis. If the tube is corrugated, it is possible that the ridges and/or valleys of the corrugations can serve as encoder marks. In another embodiment, the position-measurement device is configured as a rotary encoder. The encoder marks in a rotary encoder of this embodiment can be circularly arrayed on a disc that co-rotates with one or more rollers in a roller assembly, for example.

Electrical power can be supplied to the device 10 by one or more electrical cables 67 (which, by the way, can double as a tether). For many applications, the electrical cable(s) 67 can enter the housing 12 via an access port 61 on the side or end of the proximal fastener 56. Alternatively, the cable(s) 64 can enter the housing 12 via an access port 63 (FIG. 1) defined in the housing near the proximal end cap 20. The supplied electrical power can be used for powering the camera 26 and imaging light source 30, as well as any encoders and/or self-propulsion devices used by the device 10.

The embodiment described above provides an unobstructed, 360° view of the interior surface of the tube and provides means for displaying and recording the view over time, in real-time.

The camera 26 comprises an image sensor or the like. The image sensor 26 can be monochrome or "color," the latter not being limited to sensors that detect and display full color but includes sensors that detect and display images in multiple discrete wavelengths. With competent stitching together of images obtained by the camera, information present in the images can be correlated to location of the device 10 in the lumen of the tube.

A block diagram of an exemplary hardware configuration for a device is shown in FIG. 8A, as applied to an embodiment in which an array of multiple LEDs provides illumination light. The hardware includes a power supply 80 for the LEDs 81 of the light source. The output of the power supply 80 is normally within the range of 0 to 12 volts, depending upon the particular LEDs actually used. Light produced by the LEDs is routed to the "optics" 82 (axicon, tilted optical element, and lens assembly) and then to the camera 83 (e.g., a high-resolution video camera). Interfaced (e.g., GigE standard) with the camera 83 is a camera power supply 84, which is controlled by a computer system 85. The computer system 85 also controls a display interface 86 that, e.g., displays images obtained by the camera 83. The images can be displayed in real-time or stored in the computer system memory 88 for later recall and/or processing. Also providing data to the computer system 85 are position sensors 87 that detect the position of the device inside a tube under inspection.

A block diagram of a software system for the device, particularly as diagrammed in FIG. 8A, is shown in FIG. 8B. The depicted system is programmed in a computer system 100 to process data obtained from a data-acquisition system 102. The data-acquisition system 102 inputs data from the camera 105, as well as from one or both of a radial-position sensor 104 and an axial-position sensor 106. The computer system 100 is programmed to normalize images 108 (received from the camera 105), remove static reflections 110 from the images, unwrap the circular aspect of the images (112), and apply an anomaly-detection routine 114 to the images to identify particular types of anomalous conditions in the tube. If desired, the computer system 100 can be configured to apply false color to the produced images (116) to highlight selected features in them and to make more reliable the identification of anomalies concerning the interior surface being examined. The computer system 100 then, from these data, configures the image (118) for display 120 and, if necessary, for storage 122. These software routines can be performed continuously in real-time and presented as a contemporary video of the interior surface of the tube as the device travels in the tube.

Figure 9:
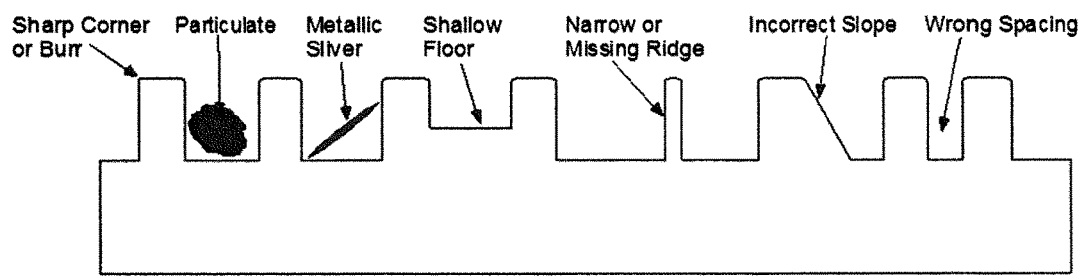
FIG. 9 schematically depicts various types of anomalies that can appear in a tube (particularly a corrugated tube) and that can be identified in an image of the interior surface of the tube obtained using a device as described herein.

Various embodiments of the disclosed devices can be used as respective parts of a non-destructive tube-inspection system used for locating defects in or on an interior surface of a tube (e.g., a corrugated tube). For example, such tubes are used as respective portions of cylindrical waveguides. The devices can be used to provide pass/fail testing protocols on finished tubes. This allows repairs to the tubes to be performed after the defects have been identified and localized. Inspection of the tube, using the device, can reveal the type of defects, and hence the cause of the defects. In corrugated tubes, defects of particular interest are those associated with particulate matter that can easily accumulate in valleys of the corrugations and with metallic slivers. FIG. 9 depicts examples of faults, detectable using the subject devices, arising in corrugated tubes, including (but not limited to) sharp corners or burrs in peaks, particles in valleys, slivers in valleys, shallow valleys, narrow or missing ridges, incorrect slope of ridges, and incorrect spacing of ridges and valleys. I.e., a wide variety of particulate, structural, and stain anomalies are detectable using this device. As the device travels in the tube, the position and orientation of the device can be manually measured, or measured using displacement sensors (encoders and the like, as discussed above). During operation of the device, contrast-enhancement protocols can be utilized to facilitate the detection of anomalies.

Example

An example device was constructed, having the general configuration as shown in FIG. 1. The tilted optical element had a 6° angle relative to the axis to place unwanted reflected imaging light out of the primary imaging zone of the camera.

The camera was a 5 megapixel monochrome camera having a gigE interface. The lens assembly was a 25 mm high-resolution lens, having a depth of field of 1.83 cm at f/4 at an object distance of 28 cm. The circle of confusion was 0.02 mm. The light source was a circular array of 16 LEDs producing 640 nm light (red). The intensity of illumination light produced by the LEDs was variable.

Figure 10:
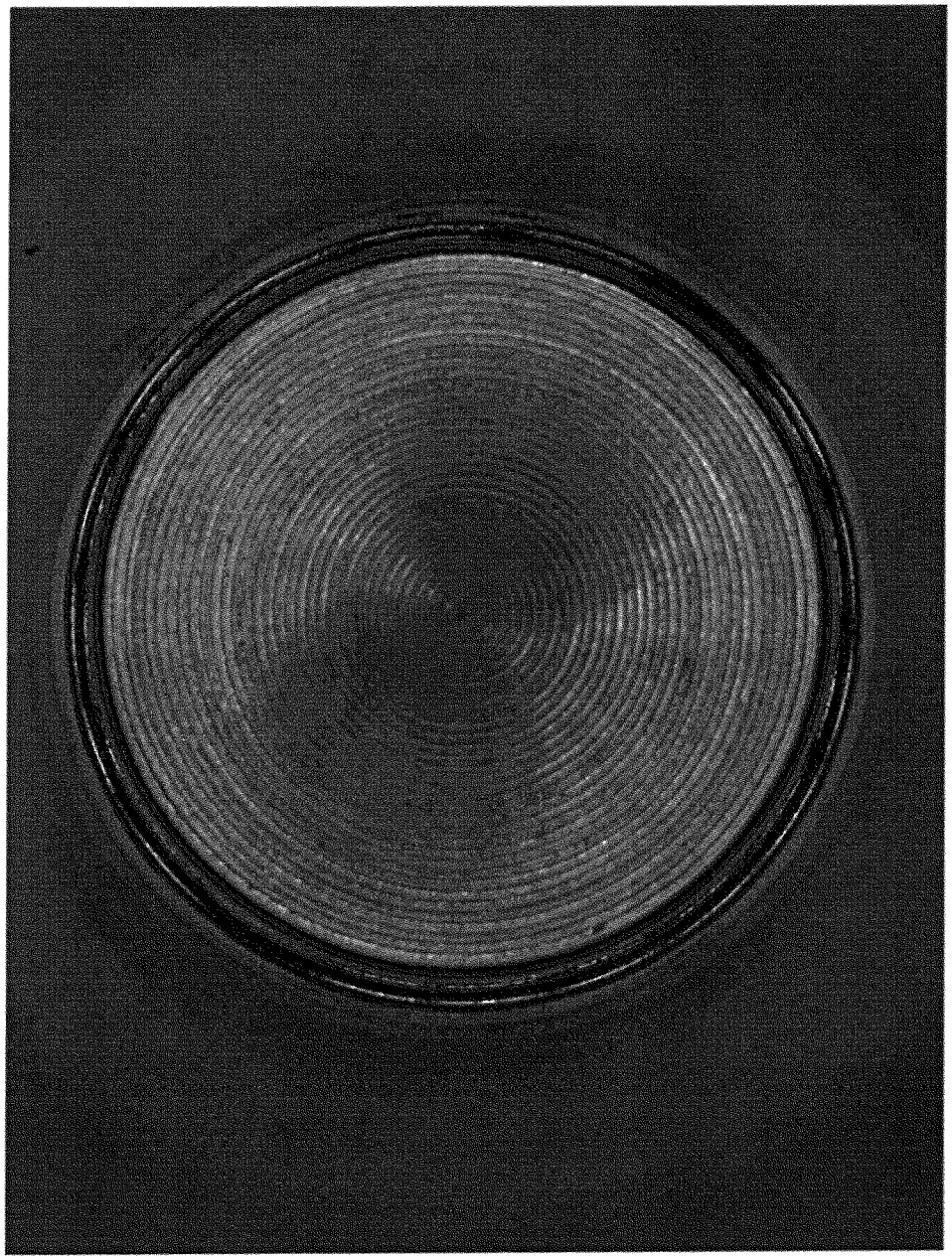
FIG. 10 is an exemplary photograph of the interior surface of a corrugated tube obtained using the example device. Comparing this figure with FIG. 4, it can be readily seen that FIG. 10 lacks the bright, saturated images of the LEDs of the light source, thereby producing a substantially uniformly illuminated image.

The example device was inserted coaxially into the lumen of a corrugated tube. An example photograph of the illuminated interior surface of the tube is provided in FIG. 10. Comparing FIG. 10 with FIG. 4, it can readily be seen that FIG. 10 lacks the saturated images of the LEDs of the light source, which results in a substantially more uniformly illuminated image of the interior surface of the subject corrugated tube. Since images of the LEDs normally do not reveal anything useful regarding the interior surface of the tube, removing the images of the LEDs allows the image to pertain substantially only to the interior surface of the tube.

Alternative Configurations and Uses

The devices described above are not limited, in terms of use, to insertion into solid tube structures. A tube can simply be a hole defined in a mass of material, e.g., a hole in the earth or other mass of material. As an exemplary alternative use, a device can be inserted into the ground or into a medium other than a solid tube structure, and used to study or examine subsurface phenomena such as root growth, moisture/nutrient transport, etc., or material morphology by imaging through the tube as a transparent window into the material.

Also, the range of tubes that can be inspected using a device as disclosed herein is not limited to tubes having circular transverse profiles. By way of example, and not intending to be limiting, a tube may have a square or other rectilinear transverse profile, or other polygonal transverse profile. Imaging data obtained by the device can be processed (or stored and recalled for later use) by software specifically configured to process images produced by reflection of light from the interior surfaces of tubes having non-circular transverse profiles.

Whereas this disclosure is made in the context of various embodiments, it is not limited to those embodiments. On the contrary, the disclosure encompasses all modifications, alternatives, and equivalents that may be included within the spirit and scope of the disclosure, as set forth in the appended claims.

What is claimed is:

1. A device for imaging an interior surface of a tube, comprising on a longitudinal axis:
    a housing extending along the longitudinal axis and having a rearward end and a forward end;
    an illumination light source comprising a circular array of spaced-apart LED point light sources configured to provide illumination light propagating forwardly on the axis, the circular array being positioned in the housing around an axial central opening defined in a plate;
    an axicon mirror positioned on the axis in the forward end of the housing to reflect the illumination light radially outward, relative to the axis, to the interior surface of the tube to produce reflected light propagating, from the illuminated interior surface, as imaging light back to the axicon mirror, wherein the axicon mirror reflects the imaging light rearwardly;
    an image sensor positioned in the rearward end of the housing and rearwardly of the axial central opening and the illumination light source, and receiving at least a portion of the imaging light rearwardly reflected by the axicon mirror; and
    a tilted optical element situated between the axicon mirror and the interior surface, the tilted optical element comprising an optical window formed in the housing adjacent the axicon mirror and tilted more than 0° but at most 10° relative to the axis, the tilted optical element directing a selected first portion of the imaging light for incidence on the plate and away from being incident on the image sensor, the selected first portion comprising images of the light-emitting elements, while allowing a second portion of the imaging light to be incident on the image sensor.

2. The device of claim 1, wherein:
    the housing adjacent the axicon mirror is transparent to the illumination light and the imaging light; and
    the tilted optical element is a respective portion of the housing adjacent the axicon mirror.

3. The device of claim 1, wherein the axicon mirror is configured to reflect illumination light radially 360° relative to the axis.

4. The device of claim 1, wherein the optical window is frustoconical.

5. The device of claim 1, further comprising a lens assembly situated on the axis between the image sensor and the illumination light source, the lens assembly receiving imaging light intended for incidence on the image sensor.

6. The device of claim 1, wherein the image sensor comprises a video camera.

7. The device of claim 1, wherein the housing comprises a first roller assembly on the forward end and a second roller assembly on the rearward end, the roller assemblies being configured for positioning the device inside the tube parallel to a longitudinal axis of the tube while allowing the device to move through a lumen of the tube.

8. The device of claim 1, further comprising at least one displacement-sensor providing data regarding position and/or orientation of the device in a lumen of the tube.

9. The device of claim 8, wherein the displacement-sensor comprises at least one encoder.

10. The device of claim 8, wherein the displacement-sensor comprises a longitudinal-distance sensor and a rotational-position sensor.

11. The device of claim 1, wherein the optical window is tilted in the range of 5° to 10° relative to the longitudinal axis.

12. The device of claim 1, wherein the optical window has a narrower end facing the rearward end of the housing.

13. A method for imaging an interior surface of a tube having a longitudinal axis, the method comprising:
    producing an illumination light propagating on the axis with an illumination light source comprising a circular array of spaced-apart LED point sources positioned around an axial opening defined in a plate situated in a housing;
    in a lumen of the tube, directing the illumination light radially outward from the axis to a region of the interior surface of the tube by reflection of the illumination light from an axicon mirror located on the axis in a forward portion of the housing to produce corresponding imaging light reflected from the region radially inward toward the axis;
    reflecting the reflected imaging light axially toward an image sensor positioned in a rearward portion of the housing and rearwardly of the axial central opening by reflection from the axicon mirror; and
    tilting a selected portion of the imaging light away from being incident on the image sensor by refraction of the imaging light through a tilted optical window arranged radially between the axicon mirror and the interior surface and tilted more than 0° and less than 10° relative to the axis, the selected portion of the imaging light comprising light from the light-emitting elements that otherwise would form images of the light-emitting elements on an image of the interior surface.

14. The device of claim 1 wherein the housing is sized for insertion into and movement within the tube.

\* \* \* \* \*